(12) United States Patent
McClung et al.

(10) Patent No.: US 11,543,262 B2
(45) Date of Patent: Jan. 3, 2023

(54) DATA ANALYTICS FOR SMART VEHICLE FUELING

(71) Applicant: TOYOTA MOTOR NORTH AMERICA, INC., Plano, TX (US)

(72) Inventors: Mark McClung, Frisco, TX (US); Gopal Kalaimani Senthilkumar, Frisco, TX (US); Emily Lerner, Frisco, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 182 days.

(21) Appl. No.: 16/210,572

(22) Filed: Dec. 5, 2018

(65) Prior Publication Data
US 2020/0182650 A1 Jun. 11, 2020

(51) Int. Cl.
*G01C 21/36* (2006.01)
*G06V 20/62* (2022.01)
*G06V 20/58* (2022.01)

(52) U.S. Cl.
CPC ..... *G01C 21/3679* (2013.01); *G01C 21/3602* (2013.01); *G06V 20/582* (2022.01); *G06V 20/63* (2022.01)

(58) Field of Classification Search
CPC ............ G01C 21/3602; G01C 21/3679; G06K 9/00818; G06K 9/3258
USPC .......................................................... 382/104
See application file for complete search history.

(56) References Cited

U.S. PATENT DOCUMENTS

| 6,859,546 | B2 | 2/2005 | Matsukawa et al. | |
|---|---|---|---|---|
| 9,881,432 | B2 | 1/2018 | McQuade et al. | |
| 10,317,240 | B1* | 6/2019 | Di Pietro | G06N 20/00 |
| 2009/0204316 | A1* | 8/2009 | Klampfl | G01C 21/3679 |
| | | | | 701/123 |
| 2010/0114478 | A1* | 5/2010 | Bai | G09B 29/102 |
| | | | | 707/E17.005 |
| 2010/0198508 | A1* | 8/2010 | Tang | G01C 21/3469 |
| | | | | 701/414 |
| 2011/0015856 | A1* | 1/2011 | Arnold | G01C 21/3611 |
| | | | | 704/E13.011 |
| 2014/0006306 | A1 | 1/2014 | Koshy | |

(Continued)

FOREIGN PATENT DOCUMENTS

| DE | 102013221585 A1 | 4/2015 |
|---|---|---|
| JP | 4994028 B2 | 8/2012 |
| KR | 101781025 B1 | 10/2017 |

*Primary Examiner* — Charles N Appiah
*Assistant Examiner* — Nicole M Louis-Fils
(74) *Attorney, Agent, or Firm* — Haynes and Boone, LLP

(57) ABSTRACT

Methods and systems for managing information about fuel stations. A system includes an imaging system and a profile management system. The imaging system is used for generating imaging data for a fuel station onboard a vehicle. The profile management system receives the imaging data. The profile management system identifies selected information for the fuel station based on the imaging data received. The selected information includes an identification of the fuel station, pricing information, and at least one of fuel inventory information, or business hours information for the fuel station. The profile management system updates a profile for the fuel station based on the selected information. The profile management system sends at least a portion of the profile for the fuel station to a target system.

20 Claims, 5 Drawing Sheets

(56) References Cited

U.S. PATENT DOCUMENTS

| | | | |
|---|---|---|---|
| 2014/0129132 A1* | 5/2014 | Yoshizu | G01C 21/3617 |
| | | | 701/400 |
| 2014/0278091 A1* | 9/2014 | Horvitz | G06Q 10/047 |
| | | | 701/533 |
| 2015/0168172 A1* | 6/2015 | Roth | G01C 21/3679 |
| | | | 701/123 |
| 2016/0002550 A1 | 1/2016 | Song et al. | |
| 2016/0005733 A1 | 1/2016 | Xie et al. | |
| 2016/0009133 A9 | 1/2016 | Spielmann | |
| 2016/0349075 A1* | 12/2016 | Son | G01C 21/3469 |
| 2017/0014811 A1 | 1/2017 | Li et al. | |
| 2017/0017412 A1 | 1/2017 | Luan et al. | |
| 2017/0059353 A1* | 3/2017 | Madine | G01C 21/3679 |
| 2017/0108344 A1* | 4/2017 | Shinde | G06Q 20/322 |
| 2017/0278402 A1* | 9/2017 | Yalla | G08G 1/096791 |
| 2018/0025278 A1* | 1/2018 | Lilik | G01C 21/3679 |
| | | | 706/11 |
| 2019/0228593 A1* | 7/2019 | Liu | G08G 1/0116 |

* cited by examiner

DATA ANALYTICS FOR SMART VEHICLE FUELING

FIELD

The present disclosure generally relates to managing information about fuel stations and, more particularly, to methods and systems for remote monitoring of information for fuel stations in substantially real-time using the imaging data provided by vehicles.

BACKGROUND

Currently, different types of navigation systems are used to identify information about fuel stations. For example, a user may use an in-vehicle navigation system or a navigation application on a mobile device to identify nearby fuel stations. These navigations systems may provide information about the nearby fuel stations. The information provided for a fuel station may include, for example, an address of the fuel station, a distance to the fuel station, and business hours for the fuel station. In some cases, however, some of the information may be incorrect or out-of-date. Further, the information provided by these available navigation systems may not include other types of information that would be useful to the user.

SUMMARY

In one example embodiment, a method for managing information about fuel stations using a profile management system implemented in a server is provided. Imaging data for a fuel station is received by the profile management system from a vehicle over a first wireless communications link. Selected information for the fuel station is identified by the profile management system based on the imaging data received from the vehicle. The selected information includes pricing information and at least one of fuel inventory information, or business hours information for the fuel station. A profile for the fuel station is updated by the profile management system based on the selected information. At least a portion of the profile for the fuel station is sent by the profile management system to a target system over a second wireless communications link.

In another example embodiment, a method for managing information about fuel stations using a profile management system implemented in a server is provided. Imaging data for a plurality of fuel stations is received from a plurality of vehicles via a network. Selected information for each of the plurality of fuel stations is identified based on the imaging data. The selected information for a particular fuel station of the plurality of fuel stations includes an identification of the particular fuel station, pricing information, and at least one of fuel inventory information or business hours information for the fuel station. A profile for each of the plurality of fuel stations is updated based on the selected information. A customized fueling solution for a target system is generated based on up-to-date information for at least one fuel station in response to an event.

In yet another example embodiment, a system for managing information about fuel stations is provided. A system includes an imaging system and a profile management system. The imaging system is used for generating imaging data for a fuel station onboard a vehicle. The profile management system receives the imaging data. The profile management system identifies selected information for the fuel station based on the imaging data received. The selected information includes an identification of the fuel station, pricing information, and at least one of fuel inventory information, or business hours information for the fuel station. The profile management system updates a profile for the fuel station based on the selected information. The profile management system sends at least a portion of the profile for the fuel station from the profile management system to a target system.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In addition, the present disclosure may repeat reference numerals, letters, or both in the various examples. This repetition is for the purpose of simplicity and clarity and does not in itself dictate a relationship between the various embodiments and/or configurations discussed.

DETAILED DESCRIPTION

Illustrative embodiments and related methods of the present disclosure are described below as they might be employed in one or more methods and systems for managing a supply of power to a communications system in a vehicle. In the interest of clarity, not all features of an actual implementation or method are described in this specification. It will of course be appreciated that in the development of any such actual embodiment, numerous implementation specific decisions must be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure. Further aspects and advantages of the various embodiments and related methods of the disclosure will become apparent from consideration of the following description and drawings.

The example embodiments described below recognize that it may be desirable to have methods and systems that use image recognition technology to identify fuel stations and generate customized fueling solutions for vehicles on the road. The example embodiments provide methods and systems that provide up-to-date and accurate information about fuel stations to prevent a driver from having to rely on external sources of information that may have outdated information about fuel stations.

In one or more example embodiments, a profile management system is provided for managing information about fuel stations. Imaging data for a fuel station is received from a vehicle over a first wireless communications link. Selected information for the fuel station is identified based on the imaging data received from the vehicle. The selected information includes pricing information and at least one of fuel inventory information or business hours information for the fuel station. A profile for the fuel station is updated based on the selected information. And at least a portion of the profile for the fuel station is sent to a target system over a second wireless communications link.

Figure 1:
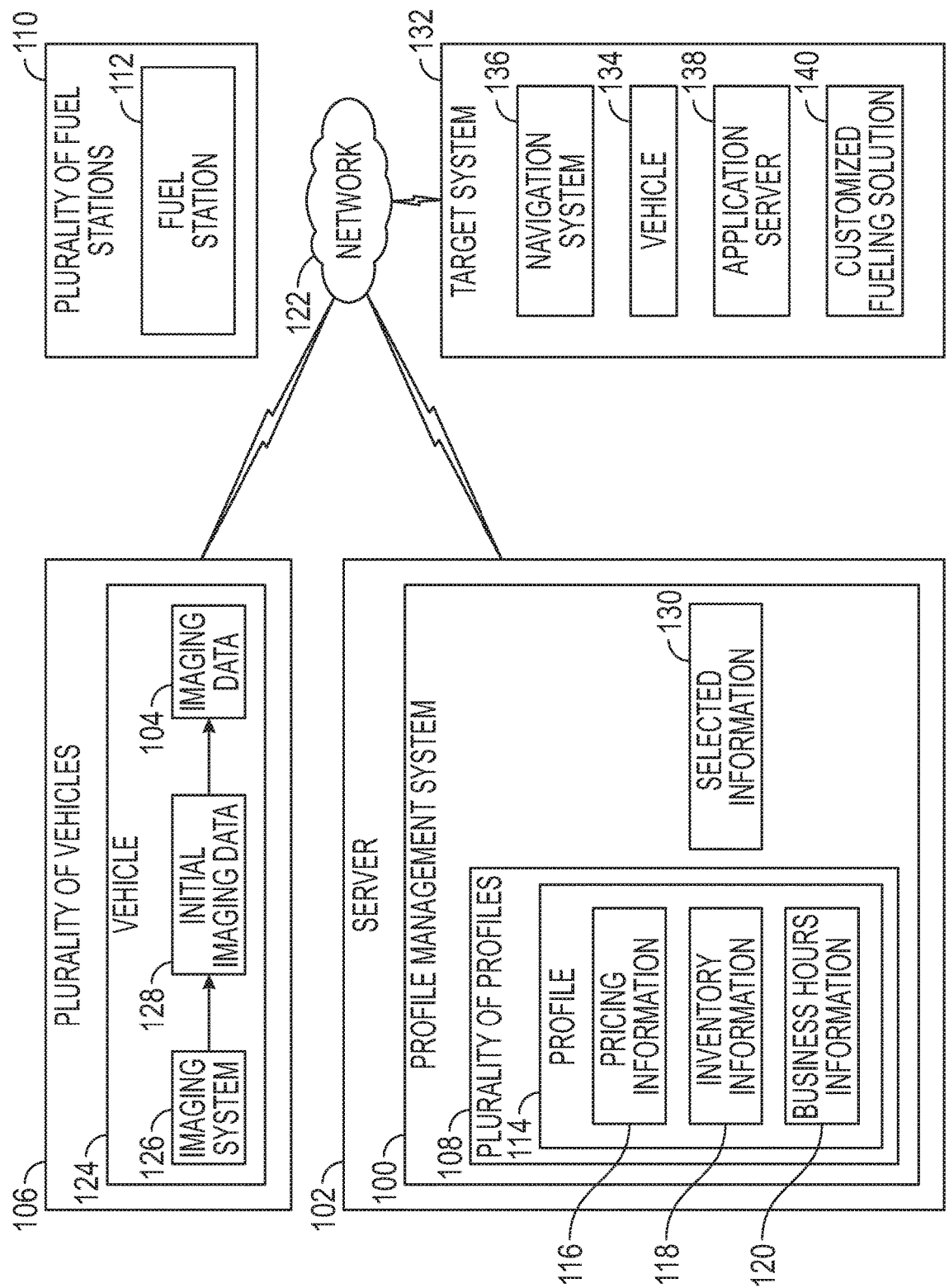
FIG. 1 is a block diagram depicting a profile management system in accordance with an example embodiment.

Referring now to the figures, FIG. 1 is a block diagram depicting a profile management system 100 in accordance with an example embodiment. Profile management system 100 is implemented using software, hardware, firmware, or a combination thereof. In some examples, profile management system 100 is implemented using a single processor or multiple processors in communication with each other. When multiple processors are used, these processors may be in communication with each other through at least one of a wired communications link, a wireless communications link, or some other type of communications link. In some examples, profile management system 100 includes various components that are in communication with each other through at least one of wired, wireless, or optical communications links.

In some examples, profile management system 100 is implemented using a cloud. In one or more example embodiments, profile management system 100 is implemented using server 102. Server 102 may include any number of servers, each of which may include at least one of a physical server, a virtual server, a web server, or some other type of server. In some examples, a server includes one or more physical servers and one or more virtual servers in communication with each other.

Profile management system 100 uses imaging data 104 received from plurality of vehicles 106 to update plurality of profiles 108 for plurality of fuel stations 110 over time. In one or more example embodiments, profile management system 100 uses imaging data 104 to update plurality of profiles 108 in substantially real-time. As used herein, substantially real-time means real-time or near real-time.

A fuel station in plurality of fuel stations 110 is a physical business entity that offers gas, diesel fuel, or both to customers. A fuel station may also be referred to as a gas station or a fuel station. Fuel station 112 is an example of one of plurality of fuel stations 110. Each profile in plurality of profiles 108 is associated with a corresponding fuel station of plurality of fuel stations 110. For example, profile 114 of plurality of profiles 108 corresponds to fuel station 112 of plurality of fuel stations 110.

Profile 114 may include various types of profile information corresponding to fuel station 112. In one or more example embodiments profile 114 includes pricing information 116 and at least one of fuel inventory information 118, business hours information 120, a location of fuel station 112, date and time information, a name of fuel station 112, or some other type of information about fuel station 112.

Pricing information 116 includes, for example, but is not limited to, a price per gallon for each of the different types of fuel offered by fuel station 112. Fuel inventory information 118 includes, for example, but is not limited to, the fuel inventory of fuel station 112. For example, fuel inventory information 118 may identify the various types of fuel offered by fuel station 112 and an indication of the amount of each type of fuel available. This indication may be a quantity or a percentage. Business hours information 120 includes, for example, but is not limited to, an identification of the business hours of fuel station 112.

Profile management system 100 is in communication with plurality of vehicles 106 via network 122. Network 122 may include any number of communications networks of any number of types and in any number of different configurations. For example, network 122 may include at least one of a local area network (WAN), a wide area network (WAN) (e.g., the Internet), a public network, a private network, a peer-to-peer network, a cellular network, an ad hoc network, some other type of radio communications network, or some other type of communications network. In one or more example embodiments, network 122 primarily allows wireless communications between profile management system 100 and plurality of vehicles 106.

Vehicle 124 is an example of one of plurality of vehicles 106. Vehicle 124 includes imaging system 126. Imaging system 126 may include any number of imaging devices. An imaging device may include at least one of a camera, a stereoscopic camera, a video camera, an infrared camera, or some other type of camera or imaging device.

As vehicle 124 travels, imaging system 126 generates initial imaging data 128. Imaging system 126 has a viewing range that is greater than the viewing range of a human person. For example, imaging system 126 may be capable of generating one or more images at a resolution that captures information about fuel station 112 that can be recognized via processing from a distance greater than or a field of view larger than a human person would be able to readily and accurately recognize the same information.

In one or more example embodiments, initial imaging data 128 may be sent as-is to profile management system 100 for processing. In these examples, initial imaging data 128 is used as imaging data 104. In other examples, initial imaging data 128 is first processed onboard vehicle 124 prior to being sent to profile management system 100 as imaging data 104 for processing.

In this manner, profile management system 100 receives imaging data 104 from vehicle 124 over network 122. For example, vehicle 124 may send imaging data 104 to profile management system 100 over a wireless communications link. As used herein, a wireless communications link may comprise any number of communications links that includes at least one wireless link or connection.

Imaging data 104 received at profile management system 100 captures information about fuel station 112. Profile management system 100 processes imaging data 104 to identify selected information 130 for fuel station 112 from imaging data 104. Selected information 130 may include pricing information, fuel inventory information, business hours information, location information (e.g., GPS information), a date and time, a name of fuel station 112, some other type of information, or a combination thereof. In one or more example embodiments, selected information 130 is identified using data analytics, cloud computing, or both. In some examples, at least a portion of selected information 130 is identified based on the metadata associated with or embedded within imaging data 104.

Profile management system 100 updates profile 114 for fuel station 112 using selected information 130. Profile 114 includes profile information. Updating profile 114 may include adding at least a portion of selected information to profile 114, replacing at least a portion of profile 114 with at least a portion of selected information 130, adding information to profile 114 or replacing information in profile 114 based on at least a portion of profile 114, or a combination thereof. Adding to or replacing information in profile 114 based on a portion of selected information 130 may include transforming the portion of selected information 130 or using the portion of selected information 130 to identify other information for use in updating profile 114.

Profile management system 100 sends at least a portion of profile 114 for fuel station 112 to one or more target systems over one or more corresponding wireless communications links. For example, profile management system 100 sends profile 114 to target system 132. Target system 132 is then able to use profile 114 or the portion of profile 114 for fuel station 112 to generate an alert or report, update its own profile or database storing information about fuel station 112, generate information for display to a driver (e.g., the driver of vehicle 134), or a combination thereof.

Target system 132 is located remotely with respect to at least a portion of profile management system 100. Target system 132 may take a number of different forms. In one or more examples, target system 132 takes the form of vehicle 134, which is a different vehicle than vehicle 124. In other examples, target system 132 takes the form of navigation system 136. Navigation system 136 may include, for example, a map provider or service (e.g., a web mapping service, a GPS navigation software application, etc.). In still other examples, target system 132 takes the form of application server 138. Application server 138 may comprise one or more servers used by any one or more software applications (e.g., web applications, mobile device applications, etc.).

When target system 132 takes the form of vehicle 134, vehicle 134 may use the portion of profile 114 received from profile management system 100 to generate customized fueling solution 140 for vehicle 134. For example, when the fuel in the fuel tank of vehicle 134 reaches a selected threshold, the generation of customized fueling solution 140 may be triggered. A system (e.g., a processor, a solution generator, etc.) may generate customized fueling solution 140 for presentation to one or more persons within vehicle 134 (e.g., the driver of vehicle 134 or a passenger of vehicle 134).

Customized fueling solution 140 may include, for example, without limitation, some portion of profile 114, a total cost for fueling vehicle 134 based on the fuel prices of fuel station 112 as determined from profile 114, an indication of whether fuel station 112 has sufficient inventory of the fuel used by or required by vehicle 134, a distance to fuel station 112, an indication of whether the identified fuel station 112 or some other fuel station should be used, an indication of whether fuel station 112 is too far and a drone should be sent to refuel vehicle 134, or a combination thereof. Because customized fueling solution 140 is ultimately generated based on imaging data 104 received from vehicle 124, customized fueling solution 140 is ensured to be up-to-date. For example, the time between the sending of imaging data 104 from vehicle 124 to profile management system 100 to the generation of customized fueling solution 140 may occur without significant delay (e.g., in substantially real-time).

In other example embodiments, profile management system 100 generates customized fueling solution 140 for vehicle 134 in response to an event. The event may be, for example, receipt of a request from vehicle 134, the lapse of a timer, an alert that vehicle 134 has entered within a selected distance of fuel station 112, or some other type of event. Profile management system 100 may then send customized fueling solution 140 to vehicle 134 via network 122. Customized fueling solution 140 may be presented to the driver or passengers within vehicle 134 visually, audibly, or both. For example, vehicle 134 may use an output system to present customized fueling solution 140. The output system may include any number of display devices, speakers, other output devices, or combination thereof.

When target system 132 takes the form of navigation system 136, navigation system 136 processes the portion of profile 114 received to generate an alert or report, update its own profile or database storing information about fuel station 112, perform some other task, or a combination thereof. When target system 132 takes the form of application server 138, application server 138 stores the portion of profile 114 received for use by one or more applications. In some cases, application server 138 processes the information in profile 114 received to form new information that is stored for use by one or more applications.

In this manner, profile management system 100 allows information about plurality of fuel stations 110 to be updated in substantially real-time and customized fueling solutions to be provided to plurality of vehicles 106 in substantially real-time. Profile management system 100 ensures that imaging data 104 received from the different vehicles in plurality of vehicles 106 is used to provide up-to-date and accurate information about plurality of fuel stations 110 to any number of target systems over time.

The illustration of profile management system 100 in FIG. 1 is not meant to imply physical or architectural limitations to the manner in which an example embodiment may be implemented. Other components in addition to or in place of the ones illustrated may be used. Some components may be optional. Also, some blocks are presented to illustrate functional components. One or more of the blocks in FIG. 1 may be combined, divided, or combined and divided into different blocks when implemented in an example embodiment.

In other example embodiments, profile management system 100 may be at least partially implemented in a vehicle, such as vehicle 124. For example, profile management system 100 may process initial imaging data 128 onboard vehicle 124 to determine at least a portion of selected information 130 onboard vehicle 124.

Figure 2:
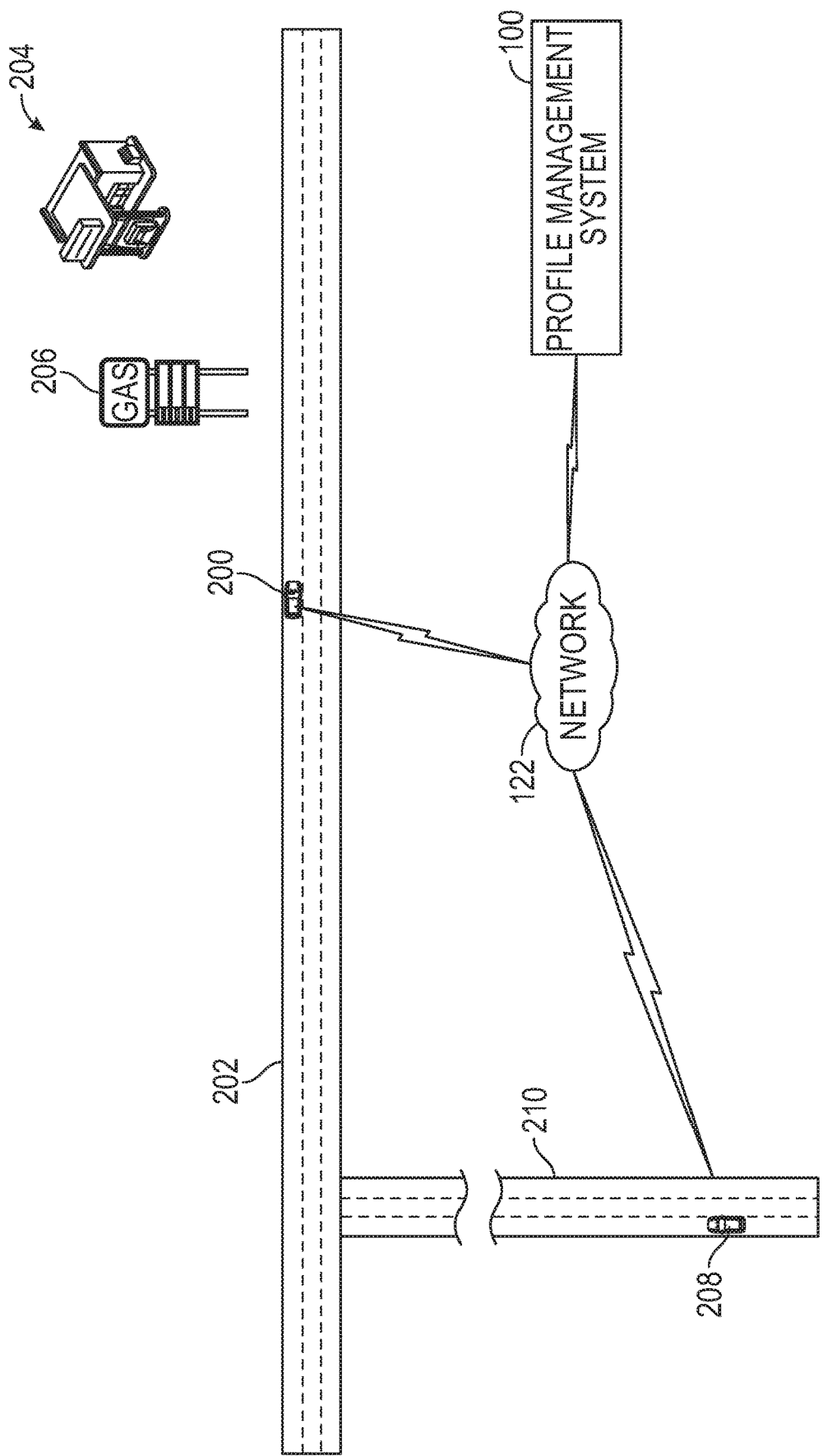
FIG. 2 is an illustration of an environment in which a vehicle generates imaging data in accordance with an example embodiment.

FIG. 2 is an illustration of an environment in which vehicle 200 generates imaging data in accordance with an example embodiment. Vehicle 200 is an example of one implementation for vehicle 124 in FIG. 2. In one example embodiment, vehicle 200 generates imaging data, such as imaging data 104 described in FIG. 1, as vehicle 200 travels along road 202 and passes by fuel station 204. Imaging data 104 captures fuel station 204 and sign 206 for fuel station 204. Sign 206 is a sign along road 202 that identifies fuel prices for fuel station 204.

In this example embodiment, vehicle 200 sends imaging data 104 to profile management system 100 via network 122 in substantially real-time and profile management system 100 updates a profile for fuel station 204 in substantially real-time. If a profile does not already exist for fuel station 204, profile management system 100 may create a new profile for fuel station 204.

In this example embodiment, vehicle 208 is traveling along road 210 within a selected distance of fuel station 204. An event may occur that generates a trigger indicating the need for a customized fueling solution for vehicle 208. In one example, profile management system 100 sends at least a portion of the information included in the profile for fuel station 204 to vehicle 208 via network 122. Vehicle 208 may then generate a customized fueling solution, such as customized fueling solution 140 in FIG. 1. In other examples, profile management system 100 generates the customized fueling solution for vehicle 208 and sends the customized fueling solution to vehicle 208 via network 122.

Although vehicle 200 is shown traveling along road 202 when vehicle 200 generates imaging data, vehicle 200 may also generate imaging data while at fuel station 204. For example, vehicle 200 may generate imaging data while filling its fuel tank with gas at fuel station 204.

Figure 3:
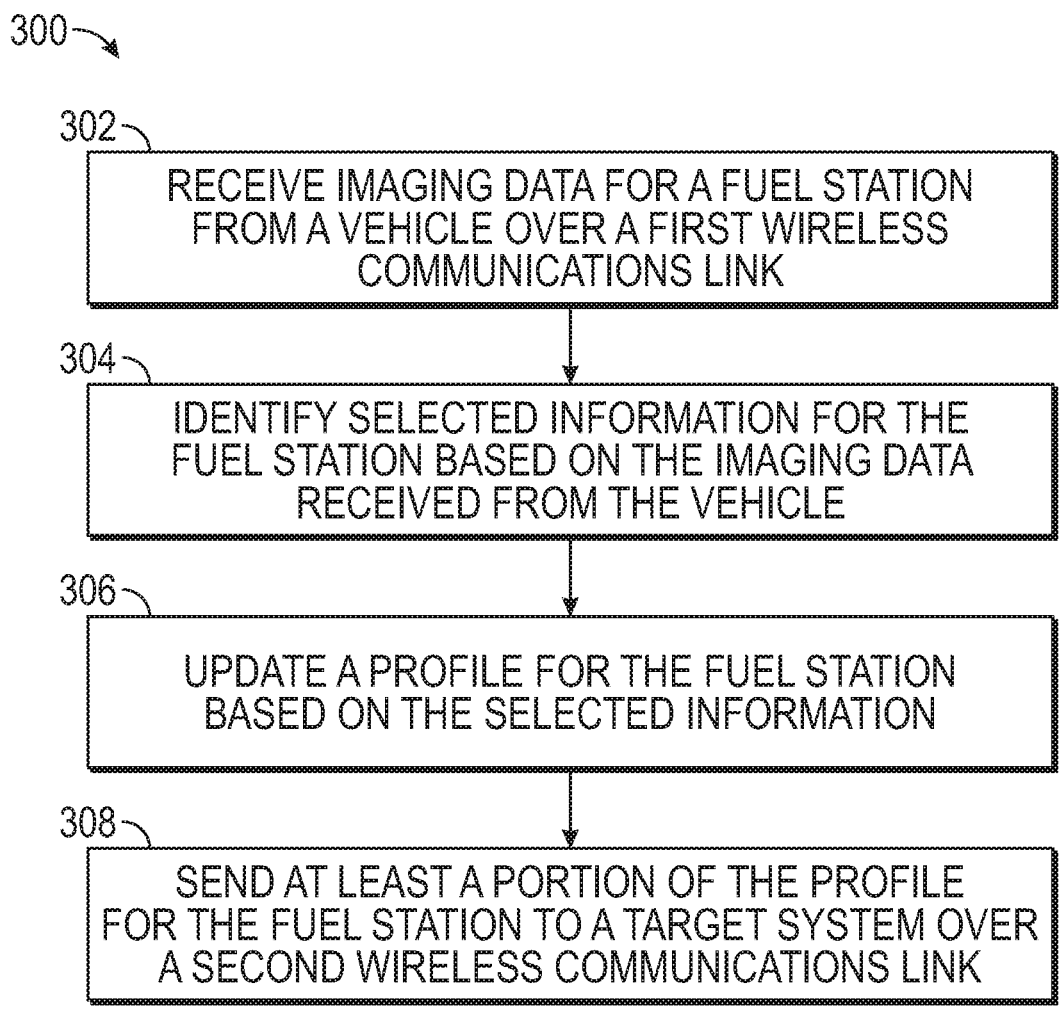
FIG. 3 is a flowchart of a method for managing information about fuel stations using a profile management system in accordance with an example embodiment.

FIG. 3 is a flowchart of a method 300 for managing information about fuel stations using a profile management system in accordance with an example embodiment. Method 300 is illustrated as a set of operations or steps 302 and 308 and is described with continuing reference to FIG. 1. One or more steps that are not expressly illustrated in FIG. 3 may be included before, after, in between, or as part of the steps 302 and 308. In some embodiments, one or more of the steps 302 and 308 may be implemented, at least in part, in the form of executable code stored on non-transitory, tangible, machine-readable media that when run by one or more processors may cause the one or more processors to perform one or more of the processes. In one or more embodiments, the steps may be performed by profile management system 100 from FIG. 1.

Method 300 may begin by receiving imaging data for a fuel station from a vehicle over a first wireless communications link (step 302). Selected information for the fuel station is identified based on the imaging data received from the vehicle (step 304). Step 304 may be performed in a number of different ways. In one or more examples, the selected information for the fuel station is identified based on the imaging data using data analytics, cloud computing, or both. For example, any number of and combination of image, text, or character recognition techniques may be used to extract the selected information.

The selected information includes pricing information and at least one of fuel inventory information, or business hours information for the fuel station. The pricing information may include, for example, fuel prices. These fuel prices may include, for example, a price per gallon for each of the different types of fuel offered by the fuel station. The fuel inventory information may include, for example, an indication of the various types of fuel offered by the fuel station and an indication of the amount of each type of fuel available. The business hours information may include, for example, an identification of the business hours of fuel station 112. In some cases, the selected information includes a timestamp for the imaging data, which may include a date and time. In some examples, the selected information includes a name of the fuel station. In other examples, the selected information includes a location of the fuel station.

In some illustrative examples, the selected information identified includes a distance of the fueling station from the vehicle based on a last known location of the vehicle, an identification of how many more miles the vehicle can drive based on the most recent sensor data indicating a fuel level in the fuel tank of the vehicle, some other type of information, or a combination thereof.

Thereafter, a profile for the fuel station is updated based on the selected information (step 306). The profile for the fuel station may be stored in a database, a cloud, associative memory, some other type of data structure, or a combination thereof. The profile may be updated by adding at least a portion of the selected information to the profile, replacing at least a portion of the information in the profile with at least a portion of the selected information, or both. In these examples, the profile for the fuel station is updated in substantially real-time, relative to the receipt of the imaging data from the vehicle.

Next, at least a portion of the profile for the fuel station is sent to a target system over a second wireless communications link (step 308). The target system may be a different vehicle, a navigation system, an application server, or some other type of target system. The profile management system ensures that the target system receives up-to-date and accurate information. In some examples, step 308 is performed in substantially real-time, relative to the receipt of the imaging data from the vehicle at the profile management system.

Figure 4:
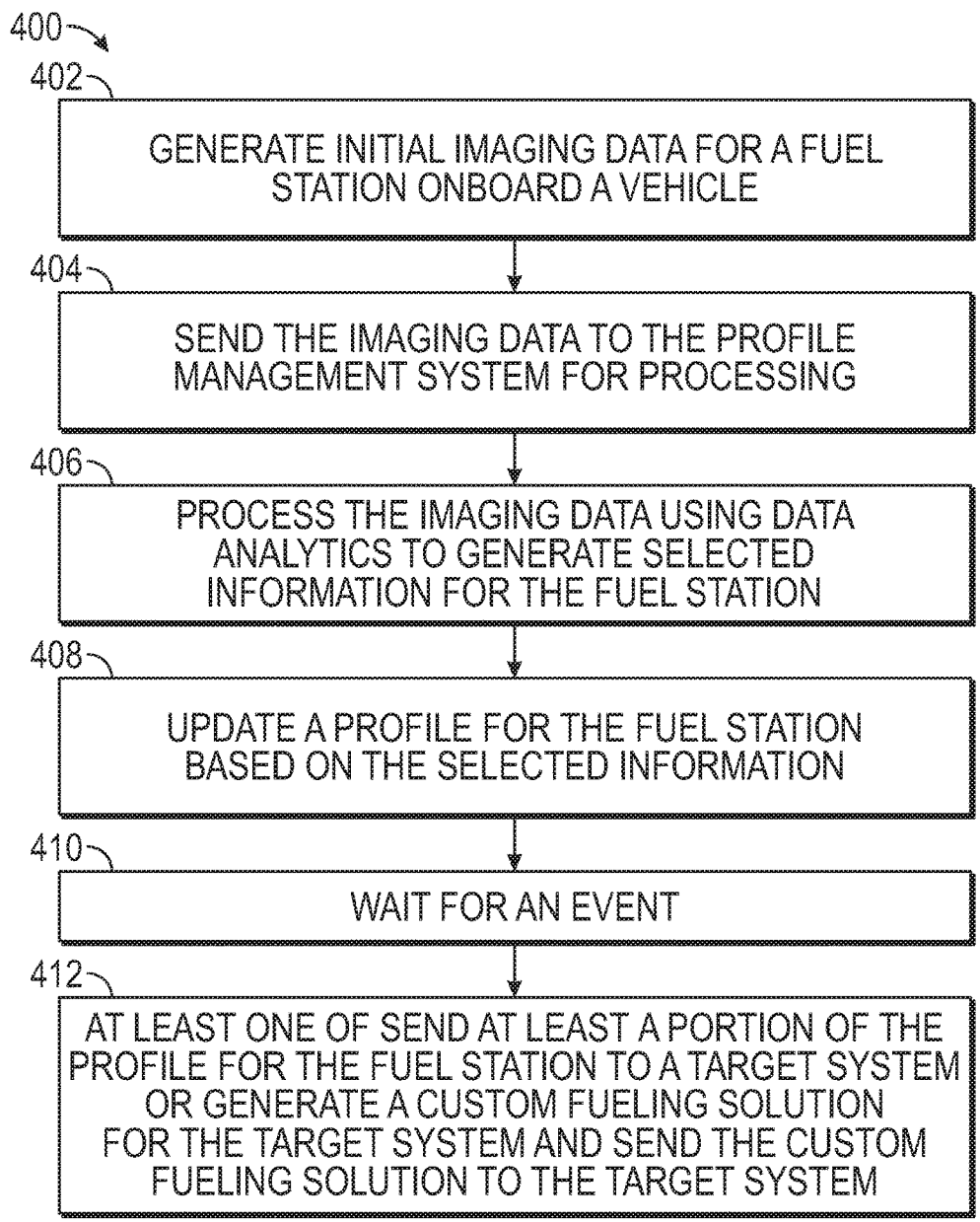
FIG. 4 is a flowchart of a method for managing information about fuel stations using a profile management system in accordance with an example embodiment.

FIG. 4 is a flowchart of a method 400 for managing information about fuel stations using a profile management system in accordance with an example embodiment. Method 400 is illustrated as a set of operations or steps 402 through 412 and is described with continuing reference to FIG. 1. Not all of the illustrated steps 402 through 412 may be performed in all embodiments of method 400. One or more steps that are not expressly illustrated in FIG. 4 may be included before, after, in between, or as part of the steps 402 through 412. In some embodiments, one or more of the steps 402 through 412 may be implemented, at least in part, in the form of executable code stored on non-transitory, tangible, machine-readable media that when run by one or more processors may cause the one or more processors to perform one or more of the processes. In one or more embodiments, the steps in method 400 are performed using a vehicle, such as vehicle 124 in FIG. 1, and a profile management system, such as profile management system 100 from FIG. 1.

Method 400 begins by generating initial imaging data for a fuel station onboard a vehicle (step 402). Next, imaging data is sent to the profile management system for processing (step 404). In some illustrative examples, step 404 includes sending the initial imaging data to the profile management system as-is. In other examples, step 404 includes first processing the initial imaging data to generate the imaging data that is then sent to the profile management system for processing. In one or more examples, the imaging data is sent to the profile management system via a network.

Thereafter, the imaging data is processed using data analytics to generate selected information for the fuel station (step 406). The data analytics may include, for example, any number of or combination of image, text, or character recognition techniques. The selected information includes, for example, an identification of the fuel station, pricing information, and at least one of business hours information or fuel inventor information for the fuel station. A profile for the fuel station is then updated based on the selected information (step 408).

The profile management system waits for an event (step 410). In response to the occurrence of the event, the profile management system at least one of sends at least portion of the profile for the fuel station to a target system or generates a custom fueling solution for the target system and sends the custom fueling solution to the target system (step 412). The customized fueling solution includes, for example, without limitation, some portion of the profile for the fuel station, a total cost for fueling the vehicle based on the fuel prices of fuel station 112 as determined from profile 114, an indication of whether fuel station 112 has sufficient inventory of the fuel used by or required by vehicle 134, a distance to fuel station 112, an indication of whether the identified fuel station 112 or some other fuel station should be used, an indication of whether fuel station 112 is too far and a drone should be sent to refuel vehicle 134, or a combination thereof.

Figure 5:
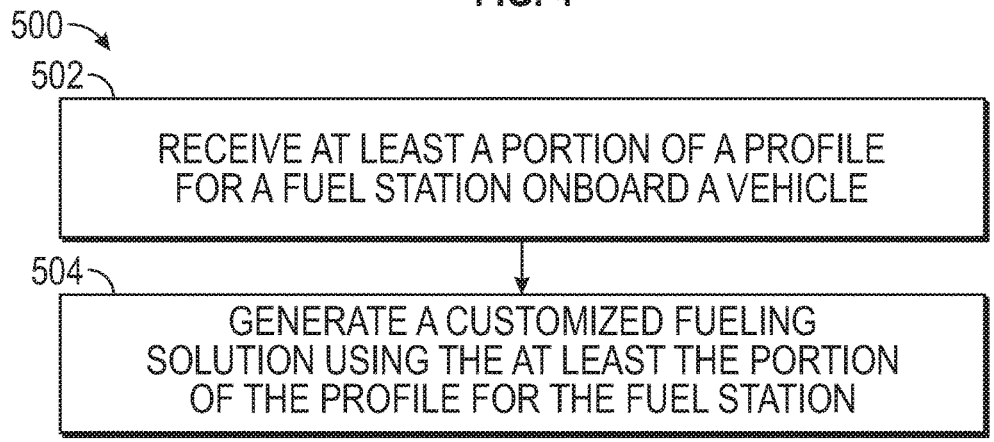
FIG. 5 is a flowchart of a method for generating a customized fueling solution in accordance with an example embodiment.

FIG. 5 is a flowchart of a method 500 for generating a customized fueling solution in accordance with an example embodiment. Method 500 is illustrated as a set of operations or steps 502 through 504 and is described with continuing reference to FIG. 1. Not all of the illustrated steps 502 through 504 may be performed in all embodiments of method 500. One or more steps that are not expressly illustrated in FIG. 5 may be included before, after, in between, or as part of the steps 502 through 504. In some embodiments, one or more of the steps 502 through 504 may be implemented, at least in part, in the form of executable code stored on non-transitory, tangible, machine-readable media that when run by one or more processors may cause the one or more processors to perform one or more of the processes. In one or more embodiments, the steps are performed by a vehicle, such as vehicle 134 in FIG. 1.

Method 500 begins by receiving at least a portion of a profile for a fuel station onboard a vehicle (step 502). The at least the portion of the profile may be received from a profile management system located remotely with respect to the vehicle. For example, the profile for the fuel station may be the profile updated in step 306 of method 300 in FIG. 3. In other examples, the at least the portion of the profile may be received from a different system, component, or processor onboard vehicle.

Next, a customized fueling solution is generated using the at least the portion of the profile for the fuel station (step 504). In step 504, the customized fueling solution is generated based on the most up-to-date and accurate profile information because the profile is updated based on imaging data generated by vehicles.

The customized fueling solution may include, for example, an identification of the fuel station that is closest to the vehicle. In some examples, the customized fueling solution also includes an identification of whether the inventory at the fuel station is sufficient for the needs of the vehicle. For example, if the vehicle requires premium gas, the customized fueling solution indicates whether the fuel station has sufficient inventory of premium gas to address the fueling needs of the vehicle based on a detected fuel level in the vehicle. For example, sensor data indicating the fuel level in the fuel tank in the vehicle may be used in the generation of the customized fueling solution.

In some examples, the customized fueling solution indicates that the fuel station closest to the vehicle is not the best option for the vehicle. The customized fueling solution may identify a different fuel station for the vehicle.

Figure 6:
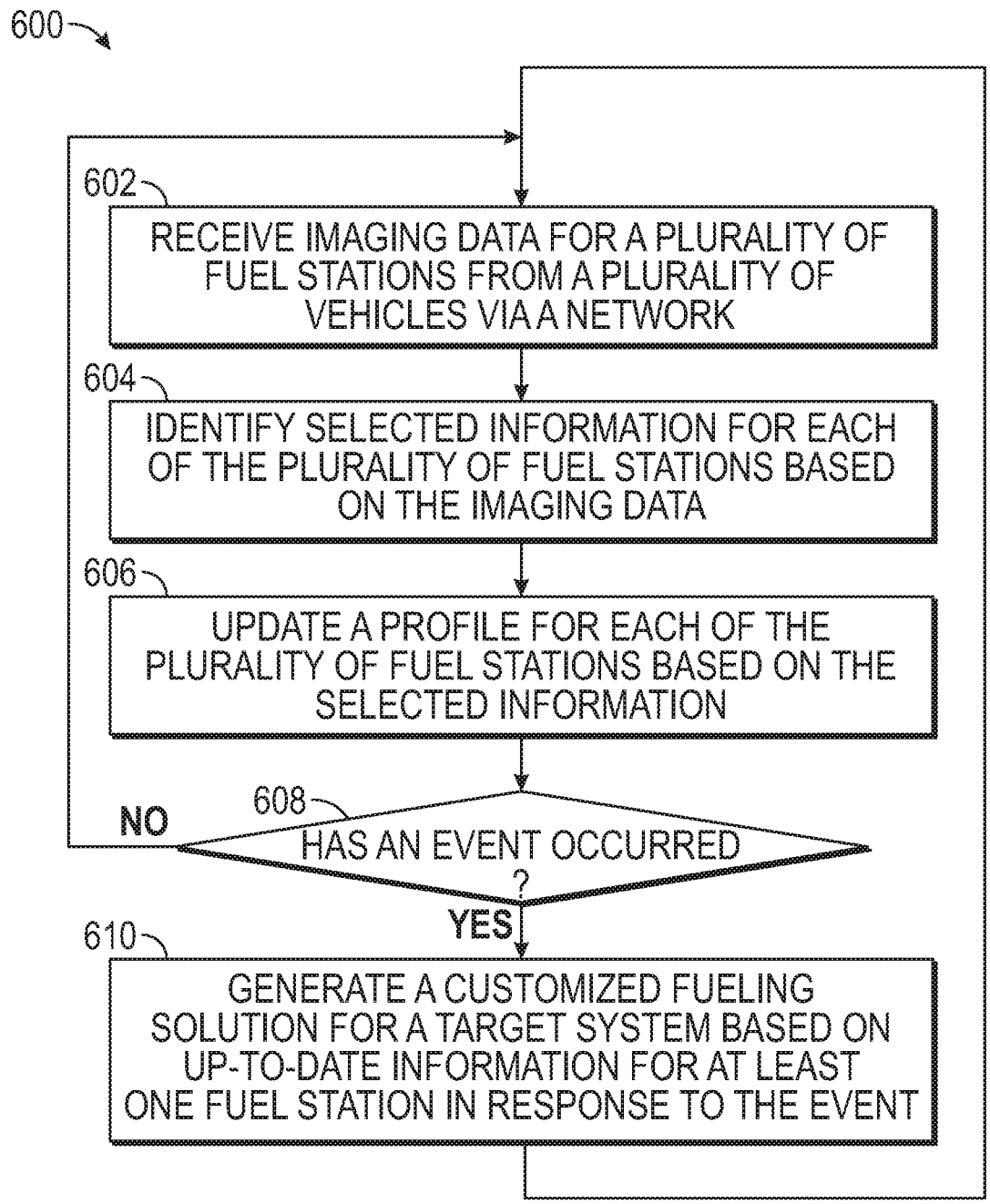
FIG. 6 is a flowchart of a method for managing information about fuel stations using a profile management system in accordance with an example embodiment.

FIG. 6 is a flowchart of a method 600 for generating a customized fueling solution in accordance with an example embodiment. Method 600 is illustrated as a set of operations or steps 602 through 610 and is described with continuing reference to FIG. 1. Not all of the illustrated steps 602 through 610 may be performed in all embodiments of method 600. One or more steps that are not expressly illustrated in FIG. 6 may be included before, after, in between, or as part of the steps 602 through 610. In some embodiments, one or more of the steps 602 through 610 may be implemented, at least in part, in the form of executable code stored on non-transitory, tangible, machine-readable media that when run by one or more processors may cause the one or more processors to perform one or more of the processes. In one or more embodiments, one or more of the steps may be performed using a profile management system, such as profile management system 100 in FIG. 1.

Method 600 may begin by receiving imaging data for a plurality of fuel stations from a plurality of vehicles via a network (step 602). Selected information for each of the plurality of fuel stations is identified based on the imaging data (step 604). The selected information for a particular fuel station of the plurality of fuel stations includes an identification of the particular fuel station, pricing information, and at least one of fuel inventory information or business hours information for the fuel station.

A profile for each of the plurality of fuel stations is updated based on the selected information (step 606). The method 600 then determines whether an event has occurred (step 608). In step 608, the event may be receiving an alert or a request for a customized fueling solution from a particular vehicle. In other examples, the event may be the lapse of a timer. In other examples, the event may be some other type of event.

With respect to step 608, if an event has not occurred, method 600 returns to step 602 described above. Otherwise, if an event has occurred, a customized fueling solution is generated for a target system based on up-to-date information for at least one fuel station in response to the event (step 610).

Thus, the example embodiments provide methods and system for providing up-to-date and accurate information for fuel stations. Profiles for fuel stations are updated based on substantially real-time imaging data that is received from one or more vehicles as the vehicles are traveling along roads near fuel stations or when the vehicles are located at (e.g., parked at or refueling at) the fuel stations. In this manner, customized fueling solutions may be provided to other vehicles based on the most up-to-date information available and without significant delay.

While certain exemplary embodiments of the invention have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art. The intention is to cover all modifications, equivalents and alternatives falling within the spirit and scope of the disclosure as defined by the claims.

What is claimed is:

1. A method for managing information about fuel stations using a profile management system implemented in a server, the method comprising:

receiving, by the profile management system, imaging data for a fuel station from a first vehicle over a first wireless communications link, wherein the imaging data is generated by the first vehicle while the vehicle is traveling along a road;

identifying, by the profile management system, selected information for the fuel station based on the imaging data received from the first vehicle, wherein the selected information includes pricing information and at least one of fuel inventory information, or business hours information for the fuel station;

updating, by the profile management system, a profile for the fuel station based on the selected information;

generating, by the profile management system, a customized fueling solution for a different vehicle than the first vehicle based on up-to-date information for at least the fuel station in response to an event, the customized fueling solution including a total cost for fueling the different vehicle based on the pricing information for the fuel station from the imaging data; and sending, by the profile management system, the customized fueling solution to the different vehicle over a second wireless communications link.

2. The method of claim 1, further comprising:
generating, by the vehicle, the imaging data using an imaging system onboard the vehicle while the vehicle is traveling along the road.

3. The method of claim 1, wherein sending, by the profile management system, at least a portion of the profile comprises:
sending, by the profile management system, the at least the portion of the profile to one of the different vehicle, a navigation system, or an application server over the second wireless communications link.

4. The method of claim 1, wherein sending, by the profile management system, at least a portion of the profile comprises:
sending, by the profile management system, at least the portion of the profile with the customized fueling solution for the different vehicle from the profile management system to the different vehicle over the second wireless communications link.

5. The method of claim 1, wherein identifying, by the profile management system, the selected information comprises:
identifying, by the profile management system, the fuel station from the imaging data.

6. The method of claim 5, further comprising:
determining, by the profile management system, whether the profile exists for the fuel station; and
creating, by the profile management system, the profile for the fuel station in response to a determination that the profile does not exist for the fuel station.

7. The method of claim 1, wherein updating, by the profile management system, the profile comprises at least one of adding at least a portion of the selected information to the profile or replacing at least a portion of information in the profile with at least a portion of the selected information.

8. The method of claim 1, wherein the customized fueling solution is created in substantially real-time relative to receipt of the imaging data at the profile management system.

9. The method of claim 1, wherein the customized fueling solution further comprises: at least one of an indication of whether the fuel station has sufficient inventory of a type of fuel corresponding to the different vehicle, a distance to the fuel station from the different vehicle, an indication of whether the fuel station is to be used, an indication of whether a different fuel station is to be used, or an indication of whether a drone should be used to refuel the different vehicle because the fuel station is too far from the different vehicle.

10. The method of claim 1, further comprising:
presenting the customized fueling solution within the different vehicle at least one of visually or audibly.

11. A method for managing information about fuel stations using a profile management system implemented in a server, the method comprising:
receiving imaging data for a plurality of fuel stations from a plurality of vehicles via a network, wherein the imaging data received from at least one vehicle of the plurality of vehicles is generated while the at least one vehicle is traveling along a road;

identifying selected information for each of the plurality of fuel stations based on the imaging data, wherein the selected information for a particular fuel station of the plurality of fuel stations includes an identification of the particular fuel station, pricing information, and at least one of fuel inventory information or business hours information for the particular fuel station;

updating a profile for each of the plurality of fuel stations based on the selected information;

generating a customized fueling solution for a different vehicle than the plurality of vehicles based on up-to-date information for at least one fuel station in response to an event, the customized fueling solution including a total cost for fueling the different vehicle based on the pricing information for the particular fuel station from the imaging data; and sending the customized fueling solution to the different vehicle.

12. The method of claim 11, wherein generating the customized fueling solution comprises:
selecting at least a portion of the profile for a selected fuel station from the profile management system to the different vehicle via the network; and
generating, by the different vehicle, the customized fueling solution based on the at least the portion of the profile received for the selected fuel station.

13. The method of claim 12, wherein the customized fueling solution includes at least one of a total cost for fueling the different vehicle based on the pricing information for the selected fuel station, an indication of whether the selected fuel station has sufficient inventory of a type of fuel corresponding to the different vehicle, a distance to the selected fuel station from the different vehicle, an indication of whether the selected fuel station is to be used, an indication of whether a different fuel station is to be used, or an indication of whether a drone should be used to refuel the different vehicle because the selected fuel station is too far from the different vehicle.

14. The method of claim 11, wherein generating the customized fueling solution comprises:
generating, by the profile management system, the customized fueling solution for the different vehicle, wherein the customized fueling solution includes at least one of a total cost for fueling the different vehicle based on the pricing information for the selected fuel station, an indication of whether the selected fuel station has sufficient inventory of a type of fuel corresponding to the different vehicle, or a distance to the selected fuel station from the different vehicle.

15. A system for managing information about fuel stations, the system comprising:
a profile management system that is configured to receive imaging data for a fuel station from a first vehicle, the imaging data being generated by the first vehicle while the first vehicle is traveling along a road; identify selected information for the fuel station based on the imaging data received, wherein the selected information includes an identification of the fuel station, pricing information, and at least one of fuel inventory information, or business hours information for the fuel station; update a profile for the fuel station based on the selected information; generate a customized fueling solution for a different vehicle than the first vehicle based on up-to-date information for the fuel station in response to an event, the customized fueling solution including a total cost for fueling the different vehicle based on the pricing information for the fuel station from the imaging data; and send at least a portion of the profile for the fuel station from the profile management system to the different vehicle.

16. The system of claim 15, wherein the profile management system is implemented in a server remote with respect to the vehicle, wherein the profile management system receives the imaging data from the vehicle via a network, and wherein the imaging data is generated by an imaging system onboard the vehicle.

17. The system of claim 15, wherein the customized fueling solution includes an indication of whether the fuel station has sufficient inventory of a type of fuel corresponding to the different vehicle.

18. The system of claim 15, wherein the selected information includes at least one of a date and time or location information for the fuel station.

19. The system of claim 15, wherein at least one of the profile management system or the different vehicle generates the customized fueling solution for the different vehicle using the at least the portion of the profile for the fuel station.

20. The system of claim 19, further comprising:
an output system onboard the different vehicle, wherein the output system is used to present the customized fueling solution at least one of visually or audibly.

* * * * *